United States Patent [19]

Shinohara et al.

[11] Patent Number: 4,628,459
[45] Date of Patent: Dec. 9, 1986

[54] COMPUTERIZED CIRCUIT ARRANGEMENT FOR JIG SAW

[75] Inventors: Shigeru Shinohara; Shun Suzuki, both of Katsuta; Tatsuo Innami, Mito, all of Japan

[73] Assignee: Hitachi Koki Company, Limited, Tokyo, Japan

[21] Appl. No.: 586,925

[22] Filed: Mar. 7, 1984

[30] Foreign Application Priority Data

Mar. 8, 1983 [JP] Japan ................................ 58-37975

[51] Int. Cl.[4] .............................................. G06F 15/46
[52] U.S. Cl. .................................... 364/475; 364/189; 30/393; 83/776
[58] Field of Search ............... 364/188, 189, 191, 192, 364/474, 475, 146, 147; 30/393; 83/778, 776

[56] References Cited

U.S. PATENT DOCUMENTS

| 4,272,821 | 6/1981 | Bradus | 364/475 |
| 4,288,851 | 9/1981 | Manabe et al. | 364/475 |
| 4,305,128 | 12/1981 | Manabe et al. | 364/475 |
| 4,513,381 | 4/1985 | Houser et al. | 364/188 |

Primary Examiner—Jerry Smith
Assistant Examiner—Allen MacDonald
Attorney, Agent, or Firm—Pollock, VandeSande & Priddy

[57] ABSTRACT

A circuit arrangement including a computer is built in an electrical jig saw where various data or information, such as the sort of the material of the workpiece, the thickness of the workpiece, desired degree of finish and way of cutting, are manually inputted via a keyboard so that the computer selects and determines optimum working condition, such as the sort of blade to be used, the locus of the blade, blade strokes per minute which is in proportion to the motor speed, and the necessity of application of coolant oil. The circuit arrangement also comprises circuitry for automatically controlling the rotational speed of the motor of the jig saw so that an actual speed of the blade equals a desired speed represented by strokes per minute. A display unit is coupled with the computer for indicating input and output data of the computer for supplying visual information to the user of the jig saw.

9 Claims, 8 Drawing Figures

FIG. 1

| | III | II | I | 0 |
|---|---|---|---|---|
| SWITCH POSITION | | | | |
| MODES OF BLADE LOCUS | | | | |

| INPUT DATA |||| OUTPUT DATA |||||
|---|---|---|---|---|---|---|---|
| WORK-PIECE MATERIAL | FINISH | WAY OF CUT | THICK-NESS (mm) | BLADE NO. || ORBIT-AL MODE | STROKES x 100/min | COOLING OIL |
| ||||  1st | 2nd ||||
| WOOD | ROUGH | STRAIGHT | 0~20 | 12 | 22 | III | 30 | NOT REQUIRED |
| | | | 20~65 | 11 | 21 | III | | |
| | | CURVE | 0~20 | 12 | 22 | II | | |
| | | | 20~65 | 11 | 21 | II | | |
| | FINE | STRAIGHT | 0~10 | 22 | | O | | |
| | | | 10~40 | 22 | | I | | |
| | | | 40~65 | 21 | | II | | |
| | | CURVE | 0~10 | 22 | | O | | |
| | | | 10~40 | 22 | | I | | |
| | | | 40~65 | 21 | | II | | |
| PLYWOOD | ROUGH | STRAIGHT | 0~10 | 12 | 22 | I | | |
| | | | 10~33 | 11 | 21 | II | | |
| | | CURVE | 0~10 | 12 | 22 | I | | |
| | | | 10~33 | 11 | 21 | I | | |
| | FINE | STRAIGHT | 0~20 | 22 | | O | | |
| | | | 20~30 | 21 | 22 | I | | |
| | | CURVE | 0~20 | 22 | | O | | |
| | | | 20~30 | 21 | 22 | I | | |
| SOFT PLASTIC | ROUGH | STRAIGHT | 0~3 | 12 | | O | 20 | |
| | | | 3~10 | 22 | | I | | |
| | | | 10~30 | 22 | 21 | | | |
| | | CURVE | 10~30 | 22 | 21 | O | | |
| NON-FERROUS METAL | FINE | STRAIGHT | 0~3 | 16 | | I | 30 | REQUIRED |
| | | | 3~12 | 15 | | I | | |
| | | CURVE | 0~3 | 16 | | O | | |
| | | | 3~12 | 15 | | I | | |
| IRON | FINE AND ROUGH | STRAIGHT | 0~3 | 16 | | I | | |
| | | | 3~4 | 15 | | I | | |
| | | | 4~6 | 15 | | I | 25 | |
| | | CURVE | 0~3 | 16 | | I | 30 | |
| | | | 3~4 | 15 | | I | | |
| | | | 4~6 | 15 | | I | 25 | |

COMPUTERIZED CIRCUIT ARRANGEMENT FOR JIG SAW

BACKGROUND OF THE INVENTION

This invention relates generally to powered jig saws, and particularly to a circuit arrangement for use with such a powered jig saw.

When operating a jig saw having a blade arranged to move along one of predetermined blade locus modes, it is necessary to determine not only the sort of a blade, the rotational speed of the motor which determines the number of blade strokes per unit time but also a most suitable blade locus mode. Furthermore, it is also necessary to determine whether it is necessary to apply coolant oil to the blade. These items have to be determined depending on various pieces of information, such as the sort of the material of a workpiece to be machined or cut, the thickness of the workpiece, a desired finish (rough or fine finish), and a desired way of cutting (straight or curve). To this end some tables showing the relationship between the sort of the material and the sort of blades, and the relationship between the orbital modes and various operating conditions, such as the hardness of the material, the thickness of the workpiece, desired cutting speed, the way of cutting, finish degree, the state of holding the workpiece or the like, are used. However, it is troublesome and time-consuming to finally determine the sort of blade and blade locus mode by using such tables. Furthermore, experiences and the sixth sense are needed to optimally determine these items. Although in some conventional electrical tools, the rotational speed of the motor is automatically controlled by detecting the diameter of the drill bit, such conventional technique cannot be simply adapted to jig saws of the above-mentioned type since the number of necessary information pieces for determining optimum operating condition is large, and since more complicated determination is required.

SUMMARY OF THE INVENTION

The present invention has been developed in order to remove the above-described drawbacks inherent to the conventional jig saws.

It is, therefore, an object of the present invention to provide a new and useful circuit arrangement for a jig saw so that not only the rotational speed of the motor is automatically controlled to provide optimum operating condition but also desired sort of blade, desired blade locus are determined, while it is checked if coolant oil is necessary or not.

According to a feature of the present invention, a circuit arrangement including a computer is provided where various data or information, such as the sort of the material of the workpiece, the thickness of the workpiece, desired degree of finish and way of cutting, is manually inputted via a keyboard so that the computer selects and determines optimum working condition, such as the sort of blade to be used, the locus of the blade, blade strokes per minute which is in proportion to the motor speed, and the necessity of application of coolant oil. The circuit arrangement also comprises circuitry for automatically controlling the rotational speed of the motor of the jig saw so that an actual speed of the blade equals a desired speed represented by strokes per minute. A display unit is coupled with the computer for indicating input and output data of the computer for supplying visual information to the user of the jig saw.

In accordance with the present invention there is provided a circuit arrangement for an electrical jig saw of the type arranged such that a replaceable blade is driven by an electrical motor so as to move along a locus selected from a plurality of orbital modes, comprising: first means for inputting information including the sort of the material of a workpiece to be cut, the thickness of the workpiece, desired degree of finish, and the way of cutting; second means for computing and determining optimum working conditions including an optimum sort of blade, optimum blade strokes, optimum orbital mode, information as to the necessity of application of coolant oil by using the inputted information; third means for displaying inputted information from the first means and the optimum working conditions from the second means; fourth means for detecting the rotational speed of the motor and producing an output signal indicative of the speed measured; fifth means for producing a control signal by using the output signal from the fourth means and the optimum blade strokes from the third means; and sixth means for controlling the rotational speed of the motor in accordance with the control signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, the above-mentioned jig saw to which the present invention is adapted, will be described with reference to FIG. 1.

Figure 1:
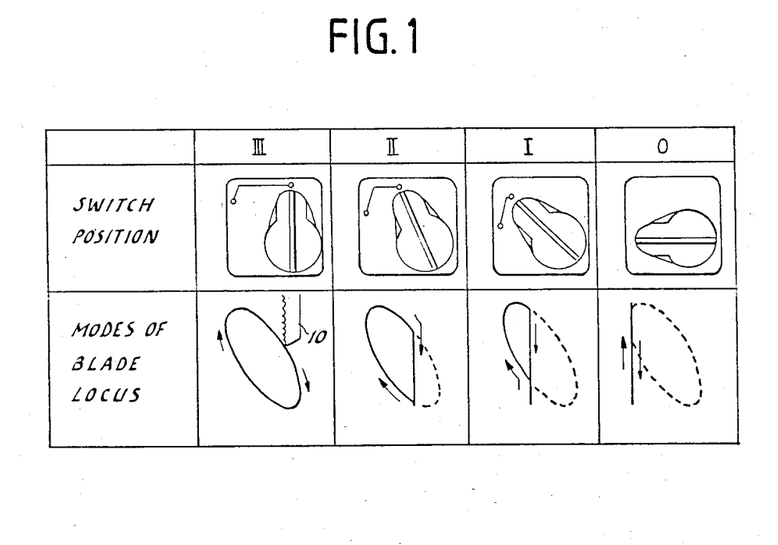
FIG. 1 is a chart showing the relationship between orbital mode switch positions and various orbital modes.

FIG. 1 is a schematic illustration showing the relationship between the position of a switch for selecting one of four predetermined blade locus modes. This switch is referred to as an orbital mode switch, and each position of the knob of the switch is referred to as orbital mode selecting position. In each orbital mode, the tip of the jig saw blade 10 moves along a predetermined locus as illustrated.

Figure 2:
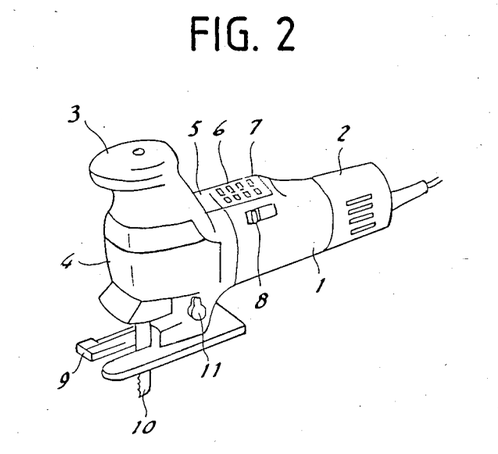
FIG. 2 is a schematic perspective view of a jig saw to which the present invention is adapted.

FIG. 2 shows a schematic perspective view of the jig saw including a circuit arrangement according to the present invention. The jig saw comprises a housing 1, a tail cover 2, a knob 3, a gear cover in which reduction gear mechanism or box is installed, a base 9, a blade 10, the above-mentioned orbital mode switch 11, a main switch 8 for supplying electrical power to a built-in motor, a display unit 5, and a keyboard 6. The display unit 5 and the keyboard 6 are received in a recess made in the housing 1 so that they are exposed outside.

Figure 3:
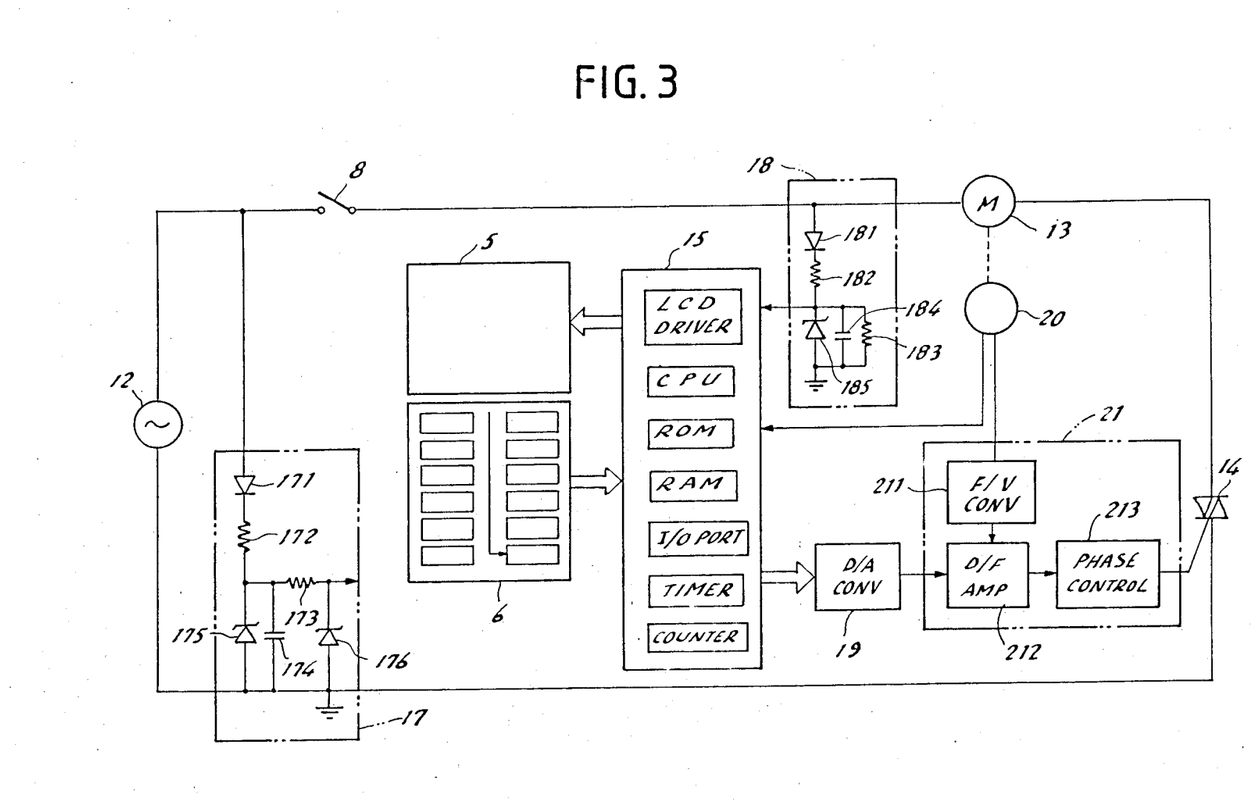
FIG. 3 is a schematic block diagram of an embodiment of the circuit arrangement according to the present invention.

FIG. 3 shows a schematic block diagram of the circuit arrangement according to the present invention. The reference 13 is the above-mentioned motor which drives the blade 10 (see FIG. 2). The rotation of the motor 13 is transmitted to an unshown gear box functioning as a speed-reduction gear, and is converted into a reciprocal movement so that the blade 10 basicaly reciprocates as the motor 13 rotates. Furthermore, an orbital movement mechanism arranged to assume one of four orbital modes is provided so that the tip of the blade 10 moves not only reciprocally but also along one of the illustrated loci of FIG. 1. A shaft of the motor 13 is equipped with four magnets equiangularly arranged along the circumference thereof for the detection of the rotational speed. Namely, a sensor 20, such as a Hall IC which icludes a Hall generator and an amplifier, or a magnetic pickup, is provided to detect each magnet each time the motor shaft rotates 90 degrees. An output signal from the sensor 20 is fed to a microcomputer 15 and to a speed control circuit 21 which will be described later in detail. The output signal from the sensor 20 is a pulse train signal, and the number of pulses per unit time originally represents the rotational speed of the motor 13, and thus the number of reciprocal strokes of the blade 10 per unit time since the number of strokes is in proportion to the rotational speed of the motor 13.

The motor 13 is arranged to receive electrical power from a power source 12 via the main switch 8 which is manually operable (see also FIG. 2). A circuit 18 including resistors 182 and 183, a diode 181, a Zener diode 185, and a capacitor 184 is a voltage detector, which produces an output signal indicating whether the main switch 8 is in closed state or not. The output signal from the voltage detector 18 is fed to the microcomputer 15. A circuit 17 including a diode 171, resistors 172 and 173, two Zener diodes 175 and 176, and a capacitor 174 is a D.C power source for supplying power to the microcomputer 15. The reference 14 is a semiconductor switching element, such as a bidirectional triode thyristor, whose firing angle or phase is controlled by a control signal from the speed control circuit 21 so that the speed of the motor 13 is controlled in turn. The speed control circuit 21 is also responsive to a signal from a D/A (digital-to-analog) converter 19 provided for converting digital data from the microcomputer 15 into an analog voltage signal. The speed control circuit 21 may be actualized an IC, such as known as TDA10-85A manufactured by Motorola Co. In detail, the speed control circuit 21 comprises a F/V (frequency-to-voltage) converter 211 responsive to the output signal from the speed sensor 20, a differential amplifier 212 responsive to the voltage signal from the D/A converter 19, and to an output signal from the F/V converter 211, and a phase control circuit 213 responsive to an output signal from the differential amplifier 212. With this arrangement the speed control circuit 21 produces an output control signal in accordance with the difference between the analog signal from the D/A converter 19, which represents a desired rotational speed or number of blade strokes, and the signal from the sensor 20 indicative of the actual rotational speed of the shaft of the motor 13.

The microcomputer 15 comprises a CPU (central processing unit), a ROM (read-only memory), a RAM (random-access memory), an I/0 (input-output) port, a timer, a counter, and an LCD (liquid crystal display) driver. A predetermined operating program is prestored in the ROM so that the CPU operates in accordance with the program as will be described in detail hereinlater.

The keyboard 6 is provided for manually inputting various data or information relating to the material of a workpiece to be cut by the jig saw, the thickness of the workpiece, a desired degree of finish and a desired way of cutting, i.e. either straight or curve. The keyboard 6 is coupled to the microcomputer 15 for supplying information or data inputted through the keys thereof to the microcomputer 15. The display unit 5, which is of liquid crystal type, is provided to visually display various information including manually inputted information and outputted data from the microcomputer 15. The liquid crystal display unit 5 is coupled to the microcomputer 15 to receive necessary data to be displayed. The keyboard 6 and the liquid crystal display unit 5 are shown in detail in FIG. 4. In the keyboard 6, keys or buttons 611, 612, 613, 614, 615, and 616 are labeled as WOOD, PLYWOOD (VENEER), SOFT PLASTIC, HARD PLASTIC, NONFERROUS METAL, and IRON, respectively, so that a selected key indicating the material of the workpiece to be machined will be readily depressed. These keys 611 through 616 are referred to as material designation keys. Keys 621 and 622 are labeled ROUGH FINISH, and FINE FINISH respectively, for selecting a desired degree of finish, and are referred to as finish designation keys. Keys 631 and 632 are labeled STRAIGHT CUT, and CURVED CUT respectively, for selecting one of two cutting ways, and are referred to as WAY-OF-CUT designation keys. A key 64 labeled THICKNESS is provided so that the above-mentioned keys 611 through 632 are changed to function as ten-keys with which the thickness of the workpiece will be manually inputted. Namely, when it is intended to input thickness information, the key 64 is first depressed, and then some of the keys 611 to 632 are depressed. Numerals 1, 2, 3 . . . shown besides the keys 611 to 632 indicate numerals which may be inputted by these keys. A key 65 labeled ANOTHER BLADE is provided to change the contents of the display relating to the sort of the blades as will be described hereinafter. Each of these keys 611 through 632, 64 and 65 generates a logic "1" signal when depressed.

Figure 4:
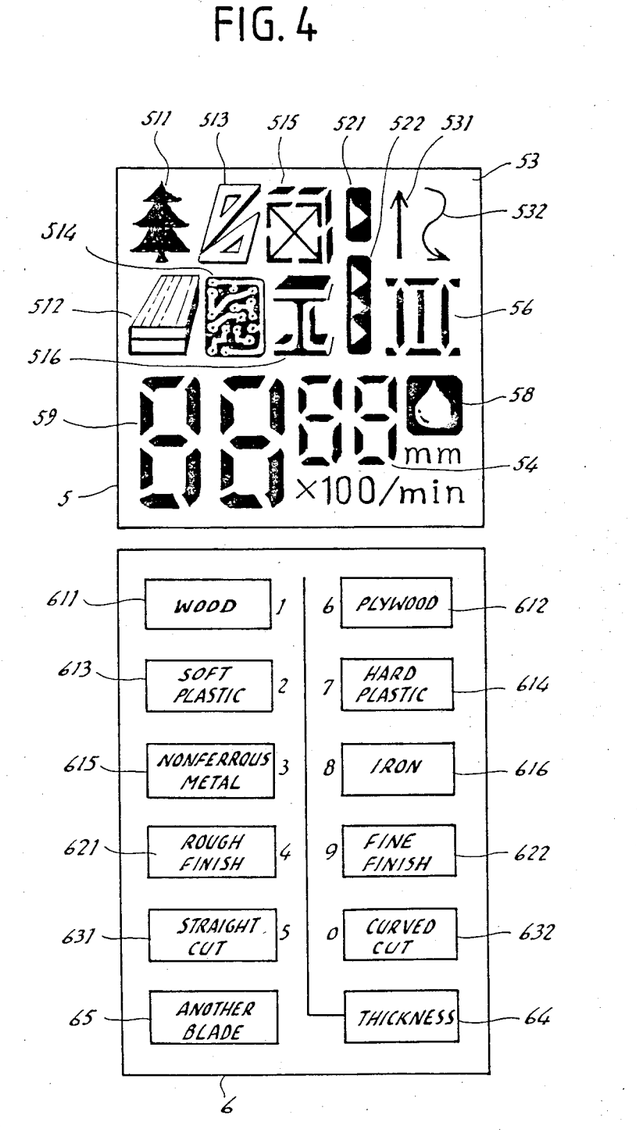
FIG. 4 is a schematic top plan view of the display unit and the keyboard both briefly shown in FIGS. 2 and 3.

The display unit 5 comprises various areas for showing the sort of the material of the workpiece by way of schematic pictures or symbols, the degree of finish, the sort of way of cutting, the orbital mode, the blade strokes, the sort of blade by way of blade No., the thickness of the workpiece, a caution for the necessity of application of coolant oil. In detail, a mark 511 represents WOOD; a mark 513, soft plastic; a mark 515, nonferrous metal, a mark 512, plywood; a mark 514, a hard plastic; and a mark 516, iron. Similarly, a mark 521 represents rough finish; and a mark 522, fine finish. Marks 531 and 532 respectively show a straight cut and a curved cut. A mark 56 indicates a position of the orbital mode switch 11, and this mark 56 may be one of 0, I, II and III depending on a determined orbital mode. A numeral display portion 59 is used to indicate either the sort of blade by number or the blade strokes at one time. Namely, when the main switch 8 is in off state, the blade No. which is most suitable or optimum for inputted information, is indicated at the portion 59, and at this time the sign X100/min is not displayed. On the other hand, after the main switch 8 is turned on, the portion 59 indicates the blade strokes actually measured. Another numeral display portion 54 is used to show the thickness of the workpiece. A symbol 58 is used to alert the user that coolant oil is needed. These symbols or numerals on the display unit 5 are selectively displayed in accordance with data from the microcomputer 15.

Figure 5:
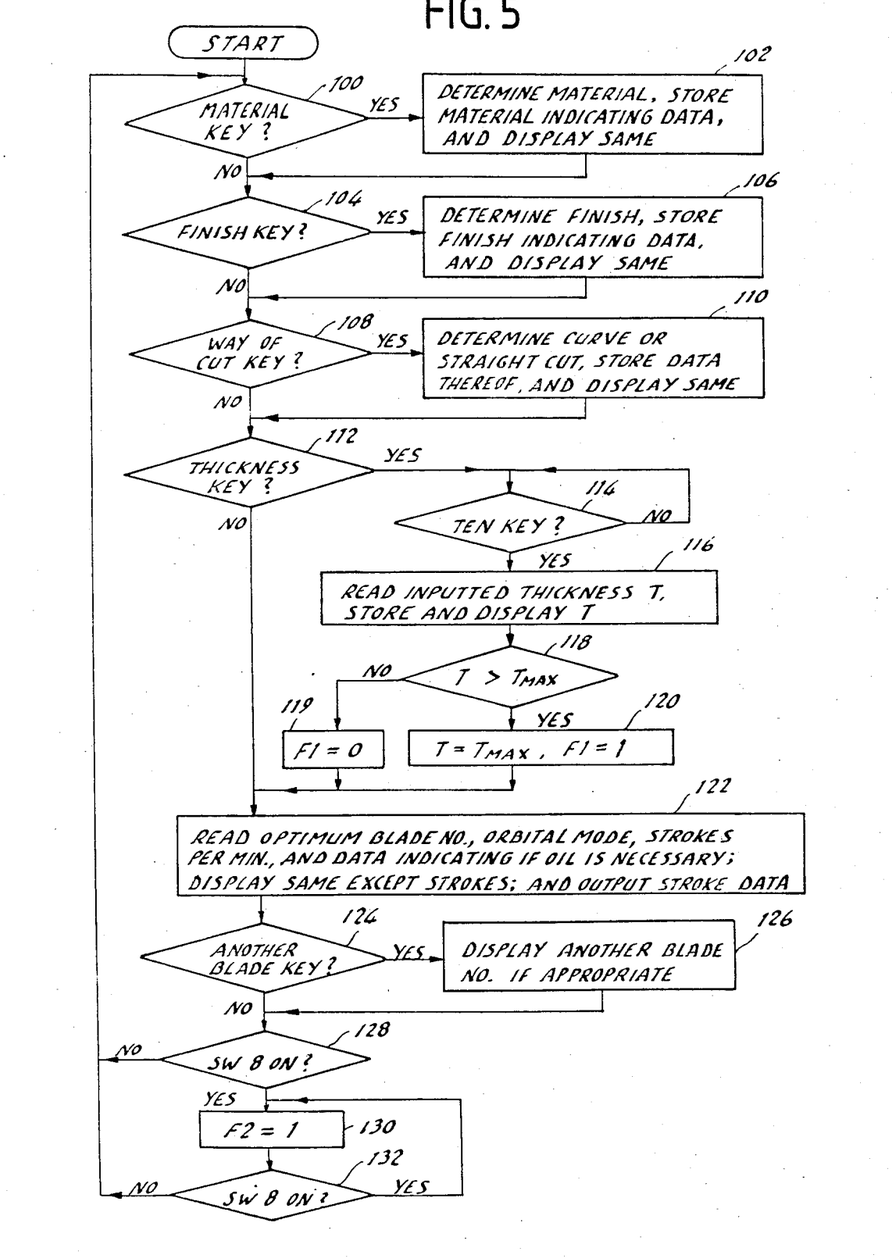
FIG. 5 is a flowchart of a main routine of the program for the operation of the microcomputer shown in FIG. 3.
Figure 6:
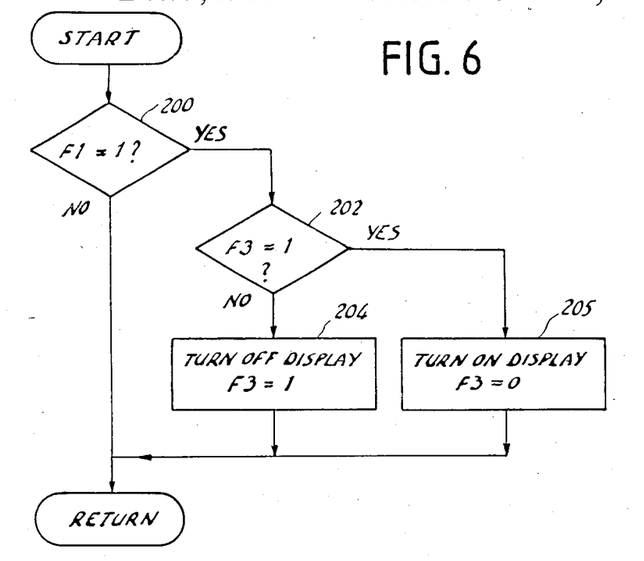
FIG. 6 is a flowchart of a timer-interrupt service routine of the program, used for alerting a user that input thickness data is greater than a predetermined maximum allowable thickness.
Figure 7:
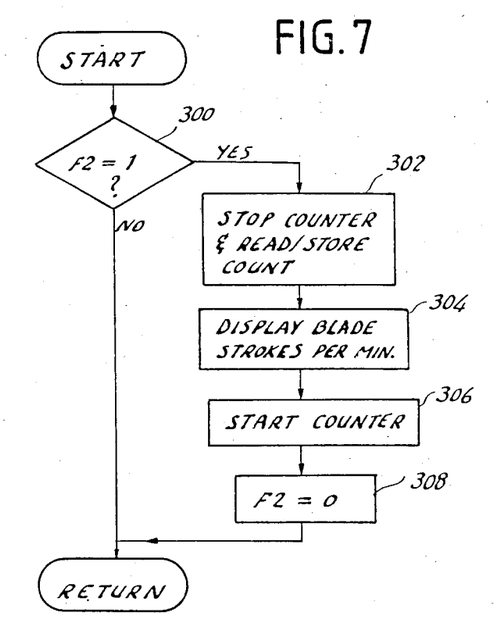
FIG. 7 is a flowchart of a timer-interrupt service routine of the program, used for measuring and displaying blade speed or strokes per unit time.

Now the operation of the embodiment will be described with reference to flowcharts of FIGS. 5, 6 and 7. The flowchart of FIG. 5 is a main routine, while remaining flowcharts of FIGS. 6 and 7 are two timer-interrupt service routines. These timer-interrupt service routines are arranged to be cyclically executed at predetermined intervals as will be described hereinlater. In the main routine of FIG. 5, although no steps are shown, the state of the keys of the keyboard 5 is scanned by the CPU to be stored in the RAM. The main routine is arranged to be started when the CPU is powered, and necessary initialization is effected (not shown). Then in a step 100 it is determined whether one of the material designation keys 611 to 616 has been depressed. If YES, a step 102 is executed to determine which material designation key has been depressed by detecting which bit is of logic "1" among data from the material designation keys 611 to 616. After this determination is completed, data indicative of the designated material is stored in the RAM, and is displayed by selectively driving a corresponding area in the display unit 5. For instance, if the IRON key 616 has been depressed, the symbol 516 is shown, while remaining symbols 511 to 515 indicative of other materials are not shown.

After the completion of the step 102 or when the determination in the step 100 is NO, a next step 104 is executed to determine whether either of the finish designation keys 621 and 632 has been depressed. If YES, it is determined in a step 106 which one of the ROUGH FINISH key 621 and FINE FINISH key 622 has been depressed in the same manner as in the step 102, and data indicative of the designated finish is stored in the RAM. Then one of the symbols 521 and 522 is displayed.

In this way, steps 108 and 110 are executed to determine which one of the WAY-OF-CUT designation keys 631 and 632 has been depressed, and then in a step 112, it is determined whether the THICKNESS designation key 64 has been depressed. If YES, it is determined in a step 114 whether the ten-key for inputting numerical data has been depressed to input actual thickness of the workpiece to be cut. If the ten-key has not been depressed yet, the step 114 is cyclically executed. When the thickness data is inputted via the ten-key, the determination of the step 114 turns YES, and a step 116 is executed to read the inputted thickness, which is expressed in terms of T, and store the same into the RAM. Then the thickness T is displayed at the numeral display portion 54. In a following step 118, it is determined whether the thickness T is greater than a maximum allowable thickness $T_{MAX}$, which is predetermined for each material and prestored in the ROM. This maximum allowable thickness $T_{MAX}$ equals the largest numerical value for the thickness shown in the TABLE. For instance, in the case of wood, $T_{MAX}$ equals 65 millimeters. If the inputted thickness is larger than the maximum allowable thicknesss $T_{MAX}$, the determination in the step 118 results in YES to execute operations necessary for alerting the user. Namely, a step 120 is exeucted in which the thickness data T stored in the RAM is rewritten to $T_{MAX}$, and a flag F1 is set to logic "1". This flag F1 will be used so that displayed thickness data intermittently flashes as will be described hereinlater. When the determination in the step 118 is NO, a step 119 is executed for resetting the flag F1 to logic "0".

Figure 8:
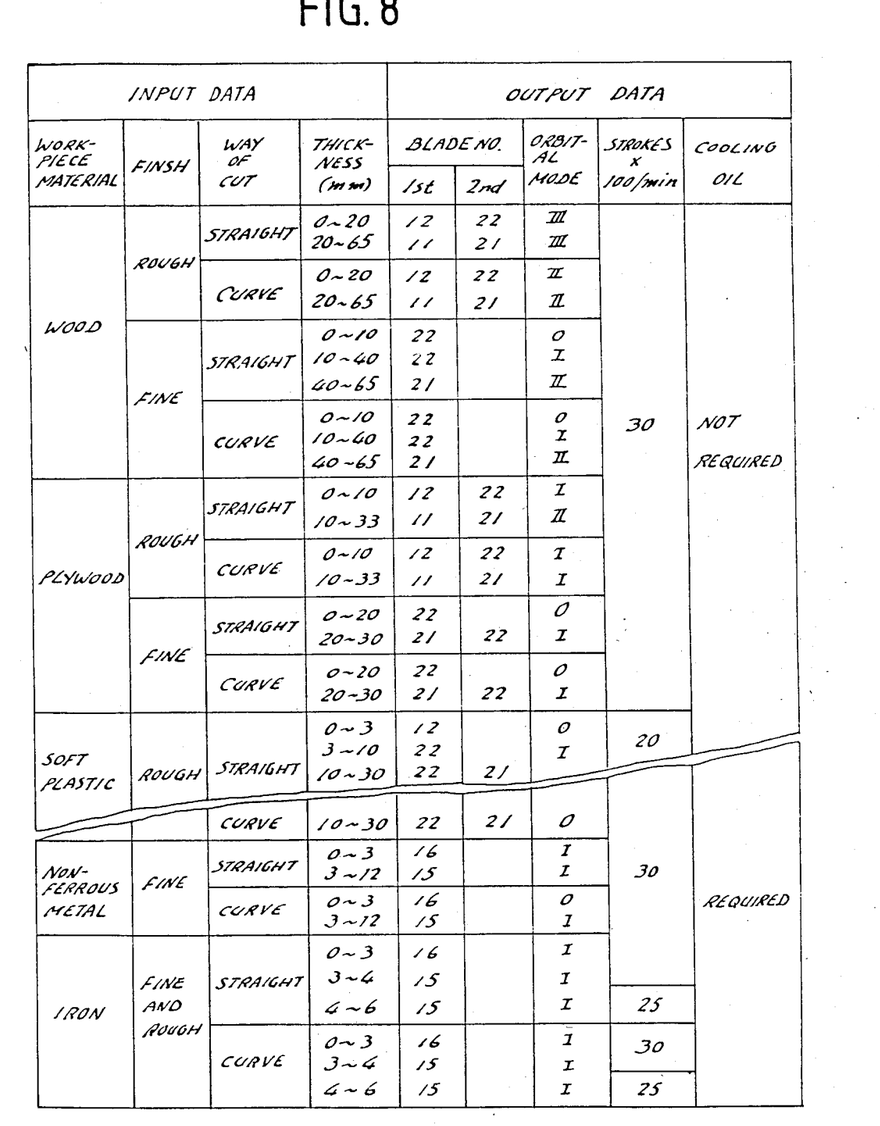
FIG. 8 is a table showing the relationship between input data and output data of the microcomputer of FIG. 3.

After the completion of the step 119 or the step 120, or when the determination in the step 112 is NO, a step 122 is executed to derive necessary information by using the above-mentioned inputted data. Namely, the output data shown at the right half of a TABLE of FIG. 8 is selectively derived by using the input data. This is done by designating an address of the ROM in which the output data of the TABLE is prestored in the form of a table, by using the input data. As soon as the output data is obtained, the blade No. and the orbital mode are displayed on the display unit 5 (see symbols or numerals 59 and 56). Furthermore, the symbol 58 indicating that oiling for cooling the blade 10 is displayed if appropriate. In the above, since both the blade No. and the strokes are displayed at the same numerical display portion 59, they cannot be displayed simultaneously. Therefore, it is arranged such that the blade No. is displayed only when the main switch 8 is in off state as will be seen from steps 128 and 132. The stroke data is therefore, simply stored in the RAM in the step 128.

Then in a step 124, it is determined whether the ANOTHER BLADE key 65 has been depressed. As will be understood from the TABLE, for some cases not only a single blade No. but also another or second blade No. may be applicable. For instance, blade No. 12 may be replaced with another blade No. 22 in the case of WOOD OR PLYWOOD. For this reason, users of the jig saw are apt to wish to know whether there is a possibility of using a blade whose No. is other than a determined and displayed one. In such a case, the user depresses the ANOTHER BLADE key 65 to see the possibility. Therefore, if the determination in the step 124 is YES, a step 126 is executed to derive a replaceable blade No. of the second column of the TABLE from the ROM, and to display the same in place of the first displayed blade No. If no replaceable blade No. is found (see empty portions in the second column of the blade No. in the TABLE), the first displayed numerals are continuously displayed without change to advise the user that no such blade No. exists. In the TABLE of FIG. 8, the blade Nos. are of Hitachi Koki Co. Ltd.

After the execution of the step 126 or when the determination in the step 124 is NO, a step 128 is executed to see whether the main switch 8 is in an on state or not. If in an off state, the operational flow returns to the first step 100. On the other hand, if the main switch 8 is in an on state, a step 130 is executed to set another flag F2 to logic "1", which flag will be used to measure and display an actual stroke of the blade 10 by using the output pulse signal from the rotaional speed sensor 20 as will be described hereinlater.

Then in a step 132, it is again determined whether the main switch 8 is in an on state or not. If YES, the step 130 is cyclically executed to continuously measure and display the actual strokes of the blade.

Turning to the first timer-interrupt service routine of FIG. 6, this interrupt service routine is arranged to be executed cyclically at every 0.5 second by a signal from the timer (see FIG. 3). In a step 200, it is checked whether the flag F1 is of logic "1" or not. If F1=0, namely if T is smaller than or equal to $T_{MAX}$ (see the steps 118 and 120), there is no need to flash the numerals indicating the thickness, and therefore the interrupt-service routine is terminated. On the other hand, if F1=1, a step 202 takes place to check whether another flag F3, which is set to logic "1" or "0" in step 204 or 205, is of logic "1" or not. If F3=0, the step 204 is executed to turn off the numerical display portion 54 and to set the flag F3 to logic "1". On the other hand, when F3=1, the step 205 is executed to turn on the numerical display portion 54 and to set the flag F3 to logic "0". After the completion of either of the steps 204 and 205, the interrupt service routine is terminated. With the provision of the timer-interrupt service routine of FIG. 6, since the steps 204 and 205 are alternately executed as long as the thickness T manually inputted is greater than the maximum allowable thickness $T_{MAX}$, the numerals indicating the maximum allowable thickness $T_{MAX}$ at the numerical display portion 54 turn on and off at every half second, resulting in flashing. Therefore, the user is alerted that the inputted thickness data is appropriate by the flashing thickness data.

Turning to FIG. 7 showing another timer-interrupt service routine, which is arranged to be cyclically started at every 0.19 second by a signal from the timer, it is checked whether the flag F2 is of logic "1" or not. Namely, when the main switch 8 is in an off state, the motor 13 is not rotating, and therefore it is meaningless to measure and display the strokes of the blade. Therefore, the interrupt service routine is immediately terminated. On the other hand, if F2=1, namely when the main switch 8 is in an on state, a step 302 is executed to stop the counter (see FIG. 3) if the counter is operating, and read the count thereof to store the same into the RAM. The counter is arranged to be started in a step 306, and since the interrupt service routine of FIG. 7 is executed at every 0.19 second, the number of pulses from the rotational speed sensor 20 is counted for 0.19 second cyclically. This time duration for measuring the number of pulses is determined by using the number of pulses generated per one revolution of the motor shaft and speed-reducing ratio of the gear box between the motor shaft and the blade so that the number of pulses per such a duration directly represents the number of strokes of the blade per minute. In the embodiment, the speed-reducing ratio is 7 to 55, while the number of pulses per full turn of the motor shaft is four, and therefore, the duration calculated by using these factors equals 0.019 second. However, in order to increase measuring accuracy, the duration is multiplied by 10 to be 0.19 second as described in the above. The count of the counter stored in the RAM in the step 302 thus represents the actual strokes of the blade 10 per minute, and this data is displayed at the numerical display portion 59 in a step 304. Then the flag F2 is reset to logic "0" in a step 308 before terminating the interrupt service routine.

Turning back to FIG. 5, optimum strokes per minute derived from the ROM are outputted from the microcomputer 15 in the step 122 as described in the above, and this data is converted into an analog voltage signal by the D/A converter 19 to be fed to the differential amplifier 21. The differential amplifier 21 compares the voltage indicative of an actual rotational speed of the motor 13, and therefore an actual blade stroke value from the F/V converter 211 with the voltage from the D/A converter 212 to determine whether the actual speed is higher or lower than the desired speed. An output signal from the differential amplifier 212, therefore, represents the difference between these two speeds, and is fed to the phase control circuit 213 which controls the firing angle of the semiconductor control element 14. As a result, the rotational speed of the motor 13 is controlled so as to approach the desired speed, and therefore the desired strokes of the blade per minute.

Although the above-described embodiment is directed to a jig saw having a gear box of a single speed-reducing ratio, the present invention may be applicable to a jig saw having a two-speed gear box. In this case, it is necessary to change the period of the timer-interrupt service routine of FIG. 7 so as to correctly detect the speed of the blade in accordance with a selected speed-reducing ratio.

The above-described embodiment is just an example of the present invention, and therefore, it will be apparent for those skilled in the art that many modifications and variations may be made without departing from the spirit of the present invention.

What is claimed is:

1. A circuit arrangement for an electrical jig saw of the type arranged such that a replaceable blade is driven by an electrical motor so as to move along a locus selected from a plurality of orbital modes, comprising:
    (a) first means for inputting information including the sort of the material of a workpiece to be cut, the thickness of the workpiece, desired degree of finish, and the way of cutting;
    (b) second means for computing and determining optimum working conditions including an optimum sort of blade, optimum blade strokes, optimum orbital mode, and information as to the necessity of application of coolant oil by using said inputting information;
    (c) third means for displaying inputting information from said first means and said optimum working conditions from said second means;
    (d) fourth means for detecting the rotational speed of said motor and producing an output signal indicative of the speed measured;
    (e) fifth means for producing a control signal by using said output signal from said fourth means and said optimum blade strokes from said second means; and
    (f) sixth means for controlling the rotational speed of the motor in accordance with said control signal.

2. A circuit arrangement as claimed in claim 1, wherein said first means comprises a keyboard attached to a casing of said jig saw.

3. A circuit arrangement as claimed in claim 1, wherein said second means comprises a microcomputer having a central processing unit, a read-only memory, a random access memory, a timer, a counter, an input-output port, and a display driver.

4. A circuit arrangement as claimed in claim 3, wherein said third means comprises a liquid crystal display unit responsive to said display driver of said microcomputer.

5. A circuit arrangement as claimed in claim 1, wherein said fourth means comprises a plurality of magnets arranged to rotate in synchronization with a shaft of said motor, and a pickup element responsive to magnetic flux from said magnets.

6. A circuit arrangement as claimed in claim 1, wherein fifth means comprises a frequency-to-voltage converter responsive to said signal from said fourth means, a differential amplifier responsive to data indicative of an optimum value of blade strokes from said second means and to an output signal from said frequency-to-voltage converter for producing an output signal indicative of the difference between these two inputs, and a phase controller responsive to the output signal from said differential amplifier for producing said control signal.

7. A circuit arrangement as claimed in claim 6, wherein said sixth means comprises a semiconductor control element responsive to said control signal, said semiconductor control element being connected to said motor in series.

8. A circuit arrangement as claimed in claim 1, wherein said first means comprises a key for producing a signal which causes said second means to derive data indicative of another blade, which may be used in place of first determined sort of blade.

9. A circuit arrangement as claimed in claim 1, wherein said third means comprises displaying sections which visually indicate at least one of said inputted information by way of symbols and marks.

* * * * *